July 14, 1942.　　T. P. SHELLY ET AL　　2,289,386
HEADING MACHINE
Filed Sept. 5, 1939　　5 Sheets-Sheet 1

FIG. 1.

INVENTOR
Thomas P. Shelly.
Thomas R. Shelly.
By 
ATTORNEY

July 14, 1942.    T. P. SHELLY ET AL    2,289,386
HEADING MACHINE
Filed Sept. 5, 1939    5 Sheets-Sheet 2

FIG. 2.

INVENTORS
Thomas P. Shelly.
Thomas R. Shelly.
By
ATTORNEY

July 14, 1942.　　T. P. SHELLY ET AL　　2,289,386
HEADING MACHINE
Filed Sept. 5, 1939　　5 Sheets-Sheet 3

FIG. 3.

INVENTORS
Thomas P. Shelly
Thomas R. Shelly.
By 
ATTORNEY

July 14, 1942. T. P. SHELLY ET AL 2,289,386
HEADING MACHINE
Filed Sept. 5, 1939 5 Sheets-Sheet 5

INVENTORS
Thomas P. Shelly
Thomas R. Shelly
By
ATTORNEY

Patented July 14, 1942

2,289,386

UNITED STATES PATENT OFFICE 2,289,386

HEADING MACHINE

Thomas P. Shelly and Thomas R. Shelly, Lachine, Quebec, Canada

Application September 5, 1939, Serial No. 293,502

14 Claims. (Cl. 10—16)

This invention relates to improvements in heading machines for the manufacture of bolts, rivets, screw blanks and the like, and the object of the invention is to provide a machine having the advantages of both open die machines, solid die machines and multiple stroke machines while avoiding the disadvantages of all these types.

Bolt heading machines are of two broad classes, namely, open die and solid die, and in each class of machine bolts are headed by hitting a blank one or more times by means of reciprocating punches, while the blanks are held in the die or dies. In the open die machines the dies are formed in two parts separable to permit stock to be fed between them from the back. The dies are then clamped together and moved laterally to shear off a proper length of stock. In the solid die machines, blanks previously severed from a length of stock are presented endwise to the die and are driven into it by the upsetting or the heading punch. With either type of die, the heading operation may be performed in one, two or more operations by a corresponding number of reciprocating punches. In the machines in general use these punches are arranged in a vertical row and are moved vertically to align them successively with the blank held in the die. In either case the machine strikes a single blow for each revolution of the crank shaft so that in double stroke or triple stroke machines, two or three revolutions of the crank shaft are necessary to the production of one bolt or the like and the output of such machines is therefore lower than that of a single stroke machine. Offsetting this fact is the greater perfection of product obtained from double and triple stroke machines. Certain forms of bolt heads cannot be produced by the single stroke method but necessitate resort to the two or three stroke method.

The primary object of the invention is to provide an open die machine having in effect, a plurality of sets of dies and a plurality of punches together with means for transferring blanks from one set of dies to the next so that at each forward stroke of the machine a blank is acted on in each set of dies and a finished product produced at each forward stroke, thus obtaining the advantages of multiple stroke combined with the advantages of single stroke and the advantages of open die machines.

A further object of the invention is to simplify machines of the multiple stroke type by arranging the dies and punches in horizontal alignment and moving the blanks from die to die instead of moving a series of punches vertically and successively into alignment with a single die.

Another object is to provide novel blank transferring means improved relatively to the transferring means commonly used in solid die machines and having an action peculiar to the requirements of the multiple open die and punch combination of this invention.

Still another object is to provide a blank transferring means adapted to remove blanks in their axial direction from between one set of dies and to insert a blank in its axial direction between another set of dies, thereby eliminating necessity for ejectors and reliance on the punches to drive blanks into the dies.

Various other objects and the advantages of the invention may be ascertained from the following description and the accompanying drawings.

Broadly speaking, the invention consists in providing a heading machine having a series of open dies arranged in a row, preferably a horizontal row, and a series of co-operating punches likewise arranged in a similarly disposed row, associated with means for transferring a blank from one set of dies to the next, said transferring means including blank engaging fingers and mean for moving the fingers vertically into blank engaging position and closing the fingers on the blank, for then moving the fingers horizontally away from the dies to withdraw the blank therefrom, for moving the fingers horizontally laterally of the dies to carry the blank from one set of dies to the next, for moving the fingers toward the dies to insert the blank therein and to release the blank, for moving the fingers downwardly out of the path of the punches and for finally moving the fingers horizontally laterally of and below the dies back to the starting point.

More particularly, the invention consists of the features and combinations of features herein described and/or illustrated in the accompanying drawings together with all such modifications thereof and substitutions of equivalents therefor as are within the scope of the appended claims.

Referring more particularly to the drawings which illustrate a preferred embodiment of the invention, but to the details of which the invention is not confined as modifications thereof are possible and contemplated.

Referring more particularly to the drawings, 21 designates the machine frame having journalled therein a crank shaft 22 provided with the usual fly wheel 23 which may serve also as a driving pulley. The frame is provided with guides 24 supporting a cross-head 25 reciprocated by a pitman rod 26 having operative connection with the cross-head and crank shaft. The front of the cross-head carries an upsetting punch 27 and a heading punch 28 removably mounted in a horizontal row in any usual or suitable type of holders 29 adjustably mounted on an adjusting block 30 which is in turn mounted on the cross-head in any suitable manner. According to this invention the usual provision for vertically reciprocating the punch holders is not necessary as the punches are arranged in a horizontal row instead of the conventional vertical row.

The front end of the frame on the surface facing the punches is formed with a shelf 31 supporting a set of three die blocks 32, 33 and 34 arranged in a horizontal row at the level of the punches. The die blocks are backed up by a cutting off die holder 35, carrying a cutting off die 36, and by a packing plate 37 and backing block 38, and may be held down by a die cap (not shown) of any usual or suitable construction. The set of die blocks are held laterally of the machine between the usual return spring mechanism 40 and the usual toggle mechanism 41, the usual filler plates 42 being interposed between these mechanisms and the end die blocks of the set or row.

The die blocks 32, 33 constitute a pair of co-operating dies and are formed on adjacent surfaces with complementary recesses or grooves 43 which combine to form a passage in which a blank may be held and upset. The blocks 33 and 34 constitute a second pair of co-operating dies and are formed on adjacent surfaces with complementary recesses or grooves 44 in which an upset blank may be held and headed. Additional surfaces of the blocks may be grooved as at 45 similarly to those already described, so that when one set of grooves becomes worn, the blocks may be turned in the usual way to bring fresh grooves into complementary relation. The longitudinal edges of the blocks are chamfered as at 46 in the usual way for cooperation with spreaders 47 operating through the die cap.

The entire set of dies has the usual limited motion as a unit transversely of the machine under influence of the toggle mechanism 41 and spring return mechanism 40. When the die set is in its extreme right hand position the mating grooves 43 of blocks 32, 33 are in alignment with the cutting off die so that stock 48 may be fed by the stock feed mechanism 49 (of any suitable or usual type) through the quill 49ª and cutting off die 36 into the grooves of die blocks 32, 33, which are at that time slightly spaced apart by the spreaders. At the same time the grooves 44 of die blocks 33, 34 are in alignment with the aperture 50 through which the ejector mechanism operates, and slightly spaced apart by the spreaders, so that the ejector mechanism may easily eject a headed product. The die set is moved by the toggle mechanism to the left, against the pressure of the spring return mechanism 40, and in this movement the length of stock previously fed between the dies 32, 33 is moved laterally by the dies and sheared off by the dies 32 and 36. During this movement the dies close and when the toggle mechanism is straightened the die blocks are clamped together between the toggle and the side frame opposite to it. At the extreme left hand position of the die set, the mating grooves 43 and 44 are out of alignment with the cutting off die and the ejector, respectively, but are in alignment with the punches, the stock gripped by the dies being backed up by the cutting off die holder so that during the upsetting and heading operations, the grip of the dies is not relied upon to hold the stock against movement in its axial direction by the impact of the punches.

The toggle mechanism is operated through a ram 51 by a flanged rotating cam 52 mounted on the crank shaft 22, the ram having a roller 53 engaging the outer periphery of the cam and a second roller 54 engaging the inner surface 55 of the cam flange, which is parallel with the outer surface, to positively retract the ram and fold the toggle mechanism independently of the action of the toggle spring 56. The ram is formed in two aligned parts connected by link means 57 held in tension by the adjustment of a break plate 58 and break screw 59.

Figure 1:
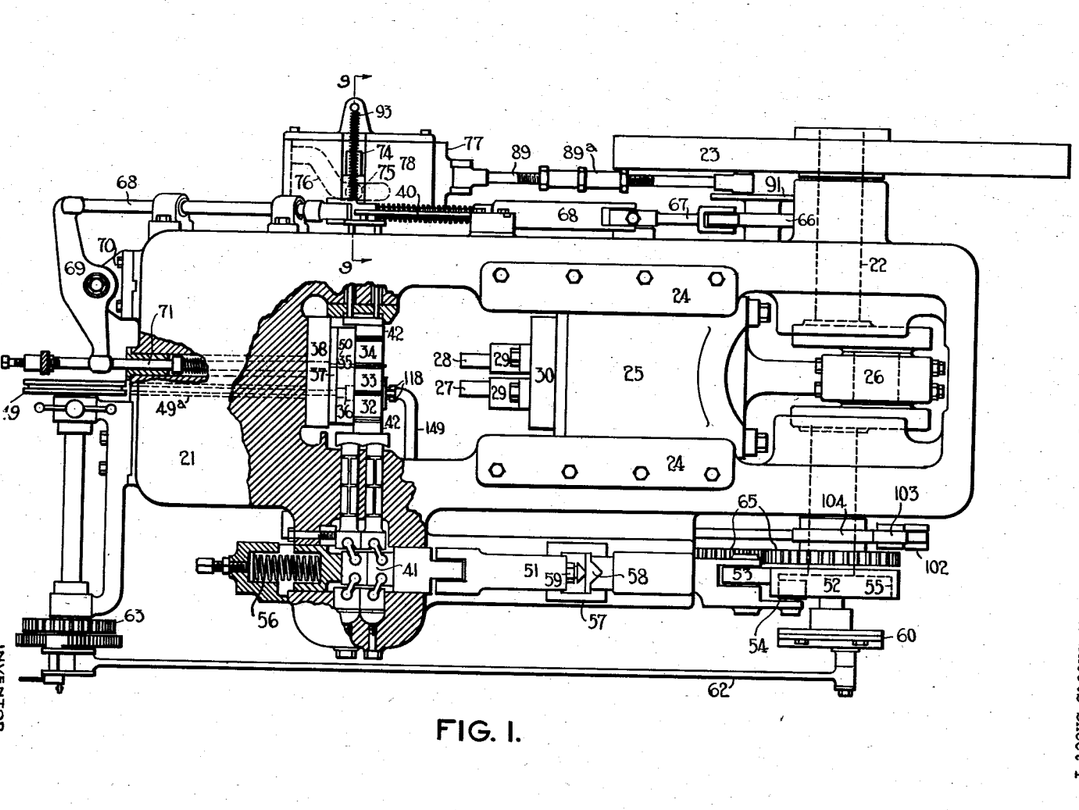
Fig. 1 is a plan view, partly in horizontal section, of a heading machine constructed according to this invention.
Figure 2:
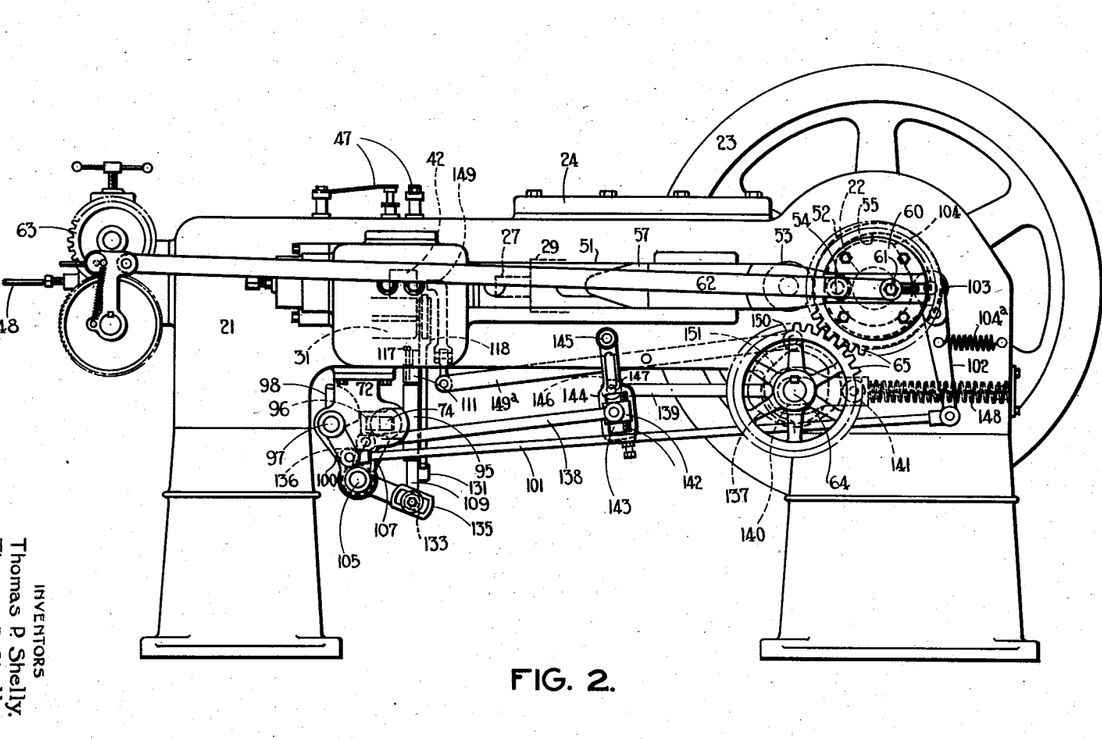
Fig. 2 is a side elevation of the right hand side of the machine of Figure 1.

The machine is provided with any usual or suitable stock feed mechanism such as that illustrated in Figs. 1 and 2, which comprises a crank disc 60 composed of two relatively rotatable parts adjustably clamped together, one of which carries a crank pin 61 adjustably mounted thereon and connected by a link 62 with a stock feeder head generally designated by the numeral 63.

A counter-shaft 64 is journalled in the frame parallel with the crank shaft and is driven therefrom at the same angular speed by gears 65.

Figure 3:
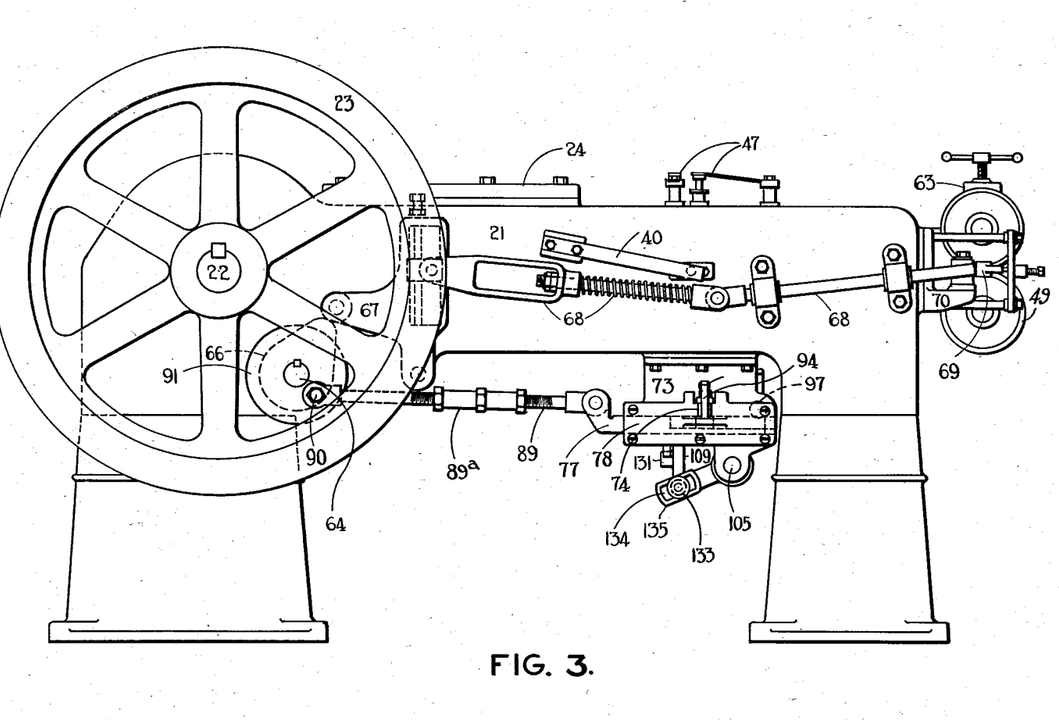
Fig. 3 is a side elevation of the left hand side of the machine.
Figure 4:
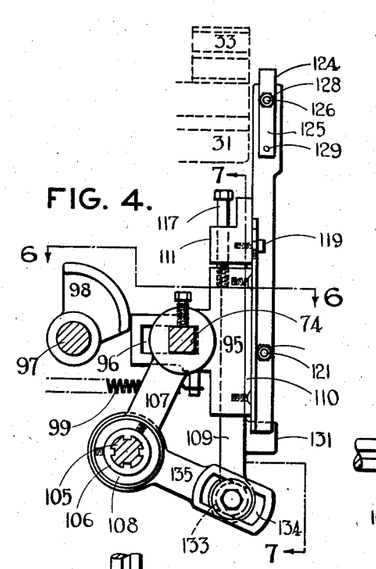
Fig. 4 is a side elevation in enlarged scale of the blank transfer means.
Figure 5:
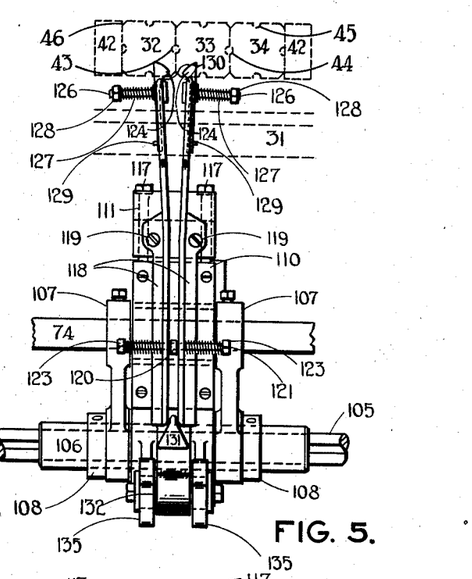
Fig. 5 is a front elevation of the blank transfer means of Figure 4.

Ejector mechanism of any suitable or usual form is provided such as that illustrated in Figs. 1 and 3 and comprising a cam 66 on the counter shaft 64, actuating a cam lever 67 to which is connected a linkage 68 transmitting motion to an ejector actuating rocking lever 69 pivotally mounted at the front end of the machine on the bracket 70. The lever 69 actuates a spring retracted ejector rod 71 which operates through the aperture 50.

*Transfer mechanism*

The transfer mechanism is mounted on sub frame member 72 and 73 depending from the right and left sides of the main frame, respectively. A carrier bar 74 extending transversely of the machine under the die shelf 31 is slidably mounted in its longitudinal direction in the said sub frame members 72 and 73.

At the left hand side of the machine, the carrier bar 74 carries a roller 75 engaging in the groove 76 of a reciprocating or shuttle cam 77 (Figs. 1, 3, 9 and 10) mounted in a housing 78 extending from the sub frame 73. The roller 75 is mounted on the bar by means of a stud 79 integral with a block 80 slidably mounted in a slot 81 formed in the bar. The block is adjustable in the bar by means of a screw 82 operatively engaging same and revolubly mounted in the bar but held against axial movement by a pin 83 mounted in the bar and engaging in a groove 84 in the screw. The block and roller are held in any adjustment on the bar by means of a cap 86 mounted on a threaded stud 87 springing from the block 80 and clamped to the bar by means of a nut 88 cooperating with the stud 87.

The rear end of the cam 77 is pivotally connected to one end of a pitman rod 89, the other end of which is pivotally connected to a crank pin 90 mounted on a crank disc 91 fixed to the counter-shaft 64. The pitman rod is made in two parts connected by a turnbuckle 89ª or other suitable means whereby the rod is adjustable as to length. The carrier bar is provided with a pin 92 connected by a retractor spring 93 to a bracket 94 on the housing 78, which spring holds the roller 75 against the driving edge of the cam groove 76.

A vertically disposed body block 95 (Figs. 4 to 7) is formed with a horizontal slot 96 through which the carrier bar passes thereby to support the block, which is slidable transversely of the bar, i. e., longitudinally of the machine, by reason of the slot.

A rock shaft 97 is journalled in the sub-frame members 72 and 73 parallel with the carrier bar and has fixed thereto a cam 98 engaging the front of the block and adapted to move the same transversely of the bar 74 and away from the dies, against the action of a retractor spring 99 connected in tension between the block and the front end of the frame. This cam is wide enough to maintain operative engagement with the body block during the transverse movement thereof. The rock shaft is actuated by a crank arm 100 (Fig. 2) fixed thereto and connected by linkage 101 with a lever 102 pivoted to the right hand side of the frame 21 and carrying a roller 103 running on a cam 104 fixed to the crank shaft. The roller 103 is urged against the cam 104 by a spring 104ª connected between the lever 102 and the frame.

A second rock shaft 105 is journalled in the sub-frame members 72 and 73 below and parallel with the carrier bar and is provided with a sliding sleeve 106 splined to the shaft. A pair of links 107 are mounted at one end on and fixed to the carrier bar, one on each side of the carrier block. The lower ends of these links encircle the sleeve 106, which is rotatable therein and is provided with collars 108 fixed thereto on opposite sides of the links. It will be apparent that when the carrier bar is moved lengthwise, the links 107 fixed thereto effect a corresponding movement of the body block 95 and the sleeve 106.

The body block is vertically grooved to receive the transfer slide 109, which is retained by the guide plate 110. The slide carries a head 111 mounted by means of a neck 112 vertically slidable in a dove-tail slot 113 in the slide. The lower end of the slot is enlarged as at 114 (Fig. 7) to receive a stop plate 115 fixed to the lower end of the neck and normally urged against the upper end of the slot enlargement by a spring 116 compressed between the lower end of the neck and the lower end of the slot 113. A pair of headed screws 117 pass through the slide head and are adjustably mounted in the body block 95. The heads of these screws overlie the slide head and limit upward movement thereof relatively to the body block 95, while permitting the slide to continue upward movement after the upward movement of the head has been stopped.

A pair of blank gripping fingers 118 are pivoted to the slide head at 119 and diverge upwardly above their pivotal points so that the gap between their upper ends is considerably greater than the diameter of blank to be gripped. Below their pivotal points the fingers depend in approximate parallelism to nearly the lower end of the slide. A lug 120 on the guide plate 110 carries a post 121 extending through the fingers below their pivotal points and supporting springs 122 compressed between the fingers and nuts 123 on the post ends.

The upper ends of the fingers are provided with loosely mounted blank gripping jaws 124 having tails 125 lying against the outer sides of the fingers. These jaws are held to the fingers by posts 126 fixed to the fingers and passing through the jaw tails, and by springs 127 on the posts compressed between the jaws and nuts 128 on the posts. Aligning pins 129 on the fingers pass through the lower ends of the jaw tails. The adjacent faces of the jaws are formed with grooves 130 suitably shaped to receive the partly or completely headed product, according to the position occupied by the transfer mechanism. The upper ends of the jaws above the groove may be divergent so as to be forcibly separated by engagement with the product if, by any improper functioning, the fingers should not have been opened.

The lower end of the slide 109 is provided with a wedge shaped cam 131 adapted to enter between the lower ends of the fingers 118 and force same apart, thereby to cause the upper ends of the fingers to approach one another and bring the jaws into blank gripping contact.

The lower end of the slide 109 is provided with a fixed transverse pin 132 carrying rollers 133, which engage in elongated slots 134 formed in crank arms 135 fixed to the sleeve 106 between the links 107 and on opposite sides of the slide.

The shaft 105 is rocked by means of a crank arm 136 (Fig. 2) fixed thereto and connected to linkage actuated by a cam 137 mounted on the counter-shaft. Preferably, the linkage is formed of two members 138 and 139, the latter of which is formed with an eye 140 encircling the counter shaft and carrying a roller 141 engaging the cam 137 on the opposite side thereof from the transfer mechanism. The linkage member 138 is pivotally connected to a block 142 adjustably mounted in the slot 143 of a lever 144 fixed on a rocking pin 145 journalled in the frame. A second lever 146 is fixed at one end to the rocking pin and is pivotally connected at the other end, at 147, to the second linkage member 139. A spring 148 is arranged to actuate the linkage 138, 139 and connected parts to urge the slide 109 of the transfer mechanism upwardly and also to hold the roller 141 against the cam 137.

Stock feed gauge

The machine is provided with any usual or suitable form of stock feed gauge herein exemplified by the pivotal gauge member 149 actuated by a lever 149ᵃ pivoted to the frame and carrying a roller 150 running on a cam 151 mounted on the counter-shaft.

Modifications

Figure 11:
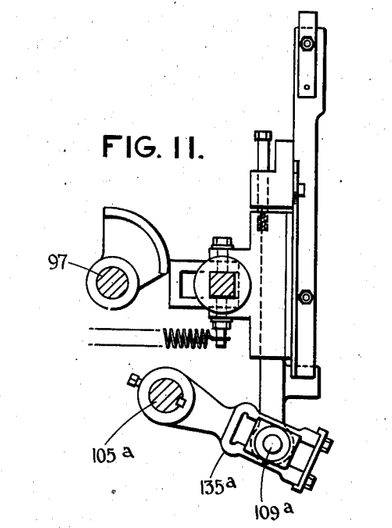
Figs. 11 and 12 are views respectively similar to Figs. 4 and 5 showing a modification.
Figure 12:
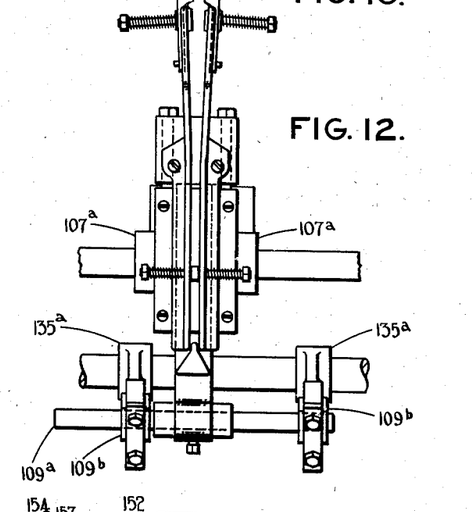

In the modified form of transfer mechanism shown in Figs. 11 and 12, the portion thereof imparting vertical movement to the transfer slide, including the rock shaft 105, sleeve 106, links 107 and crank arms 135, is replaced by means including a rock shaft 105ᵃ to which is fixed a pair of slotted crank arms 135ᵃ spaced apart sufficiently to accommodate the transverse movement of the transfer mechanism therebetween. The lower end of the transfer slide 109 carries a fixed transverse pin 109ᵃ axially slidable through flanged shoes 109ᵇ slidable in the slots of the crank arms 135ᵃ. Collars 107ᵃ are fixed to the carrier bar on opposite sides of the body block to move the same transversely with the carrier bar. It will thus be seen that, instead of transmitting the transverse motion of the carrier bar to the sleeve 106 and crank arms 135, the body block and vertical slide merely move transversely between the spaced arms 135ᵃ.

Figure 13:
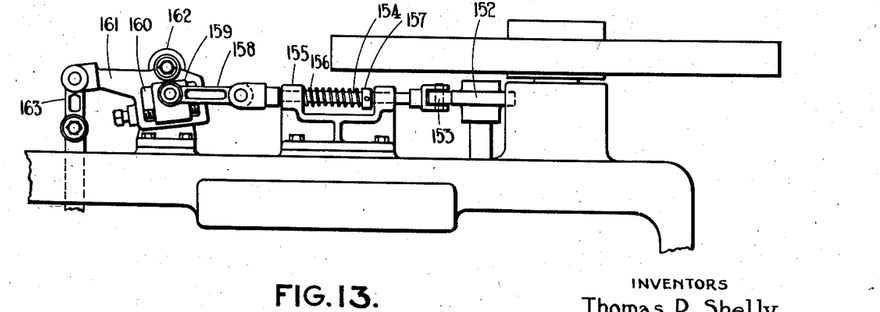
Fig. 13 is a partial plan view of the left side of the machine showing a modified form of blank transfer means actuating mechanism.

Instead of the shuttle cam mechanism shown in Figs. 1, 3, 9 and 10 there may be substituted a cam actuated link and lever mechanism shown in Fig. 13. In this alternative mechanism the crank and pitman rod are replaced by a cam 152 on the counter shaft running against a roller 153 on a push rod 154 slidably mounted in a bracket 155 fixed to the left hand side of the frame 21. A spring 156 is provided to hold the roller against the cam and to retract the carrier bar 74, as by being mounted on the push rod in compression between the bracket and a collar 157 fixed to the push rod. The forward end of the push rod is pivotally connected to one end of a link 158, the opposite end of which is pivotally connected to a block 159 slidably adjustable in a slot 160 in one arm of a bell crank lever 161 pivotally mounted on a bracket 162 fixed to the frame 21 adjacent the carrier bar. The other arm of the bell crank lever is pivoted to one end of a link 163, the other end of which is pivoted to the carrier bar 74. Adjustment of the block 159 serves the same purpose as adjustment of the roller block 80 of Fig. 9, namely, to adjust the lateral positioning of the transfer mechanism relatively to the dies.

Operation

When the punches are retreated, the dies 32, 33 and 34 are in the right hand position with the toggle mechanism 41 folded and the return spring 40 relaxed, the die blocks are separated by the spreaders 47 in the usual manner as shown in Fig. 1. The mating grooves of die blocks 32 and 33 are aligned with the cut-off die 36 and the gauge 153 is elevated in gauging position. Stock is fed by the feed mechanism through the cutting off die and through the grooves of dies 32 and 33 until it projects sufficiently beyond the face of the dies 32, 33, as determined by the gauge. At this time the transfer mechanism is at its lower right hand position A, Fig. 8.

The toggle is now straightened by its actuating means and moves the die set to the left sufficiently to shear off the length of stock projected through the dies. This movement first flexes the return spring and then urges the die set against the left hand side of the frame, so that the die blocks 32, 33 and 34 are tightly clamped together and hold the several lengths of stock positioned between die blocks 32, 33. The crosshead 25 advances and the punch 27 upsets the end of stock projecting from the face of the dies, the forward end of the stock being butted against the die plate 35 so that the upsetting is positive and without reliance on the grip of the dies to hold the stock against slipping back under the upsetting pressure. At some time between the completion of the stock feeding operation and the commencement of the upsetting operation, the stock gauge 149 is moved out of the path of the punch 27.

The toggle is now buckled and the return spring 40 returns the dies to their original positions where they are separted by the spreaders 47. Fresh stock is fed and serves to eject the upset blank from between the dies 32, 33. While the dies have been returning, the transfer mechanism has been rising from position A to position B, Fig. 8, in which the jaw grooves 130 are in position to close on the emerging blank. The final upward movement of the transfer slide 109 carries the wedge cam 131 between the lower ends of the fingers 118 and causes the jaws to close on the upset blank and grip the shank of same between the upset and the face of the dies. This lateral closing of the jaws on the blank prevents the blank being displaced or improperly gripped as might happen if the engagement was effected merely by upward movement of the jaws.

Figures 6, 7, 8:
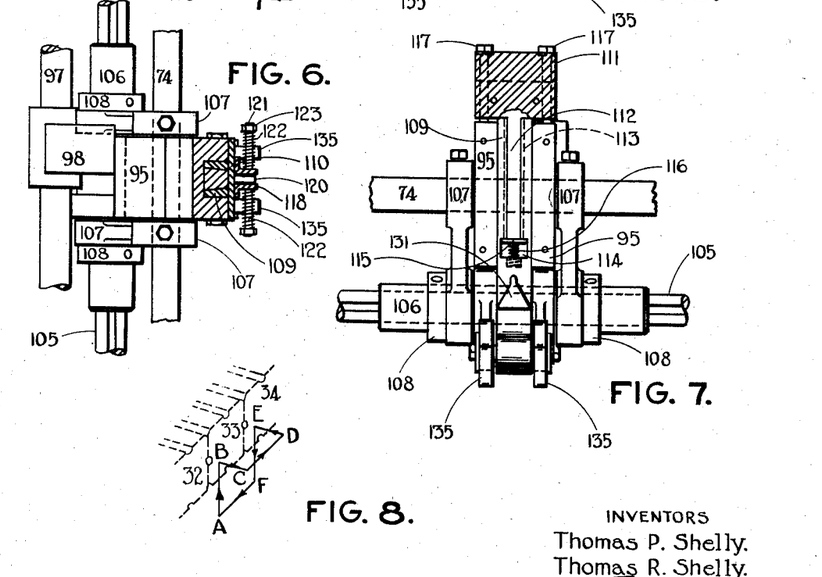
Fig. 6 is a horizontal sectional view of the blank transfer means on the line 6—6 of Fig. 4.
Fig. 7 is a partial front elevation of the blank transfer means partly in section on the line 7—7 of Fig. 4, with the transfer fingers and guide plate removed to show details of the finger closing and opening mechanism.
Fig. 8 is a diagram illustrating the path of movement of the blank transfer fingers relatively to the dies.
Figure 9:
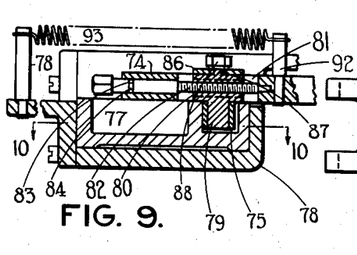
Fig. 9 is a transverse sectional view on an enlarged scale at the line 9—9 of Fig. 1 showing the blank transfer means actuating mechanism.
Figure 10:
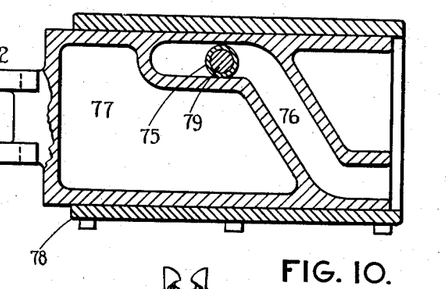
Fig. 10 is a horizontal sectional view on the line 10—10 of Fig. 9.

At this time the shaft 97 is rocked and the cam 98 forces the body block and fingers away from the dies so that the upset blank is drawn completely out of the dies and the transfer mechanism arrives at point C, Fig. 8.

When the end of the upset blank is well clear of the dies, the cam 77 moves the carrier bar 74 and transfer mechanism thereon to the left into position D, Fig. 8, in which the upset blank is perfectly aligned with the mating grooves of die blocks 33, 34. In this lateral movement of the carrier bar, the body block 95 slides across the cam 98, which remains stationary to hold the transfer mechanism in its rearward position. As already described, the links 107 shift the sleeve 106 and attached crank arms 135 on the shaft 105, so that the relation of the crank arms to the slide 109 is not altered.

When the transfer mechanism reaches position D, Fig. 8, the rock shaft 97 and cam 98 return to their original positions and the return spring 99 draws the transfer mechanism toward the dies, to position E, Fig. 8, and carries the upset blank toward the mating grooves of the die blocks 33, 34, which are now in process of closing.

As soon as this is accomplished, the shaft 105 returns to its original position and lowers the transfer mechanism to position F, Fig. 8, out of register with the dies and out of the path of the punch 28. In the first part of the movement of the rock shaft 105 and crank arm 135, the transfer head and fingers are held up by the spring 116 (Fig. 7), while the slide descends to withdraw the cam 131 from between the fingers and allow the springs 121 operating through the fingers to move the jaws laterally out of contact with the upset blank which has been inserted between the die blocks 33, 34. This preliminary disengagement of the jaws from the upset blank prevents the subsequent downward movement of the transfer mechanism from displacing the blank in the dies.

While the transfer mechanism is moving from position C to position D, the toggle mechanism operates again to close the dies and move same to the left. The cross-head 25 advances again and the punch 28 drives the upset blank forwardly in the dies 33, 34 until it butts against the plate 35 and then completes the heading operation. The advance of the cross-head is simultaneous with the movement of the transfer mechanism from position D to position E so that the punch engages the upset at about the instant the jaws open. The transfer mechanism descends from position E to position F while the punch is driving the upset blank into the dies.

During the heading operation, the cam 77 again actuates the carrier bar 74 to return same to original position and shift the transfer mechanism from position F back to its starting point at position A, Fig. 8.

It will be understood that a blank between dies 32, 33 is upset at the same time a previously upset blank between dies 33, 34 is being headed. When the dies return to their right hand position and open, the headed blank between dies 33, 34 is ejected by the ejecting mechanism during the time an upset blank is being ejected from between dies 32, 33. As the transfer mechanism is in register with dies 32, 33 during the ejection of a headed blank from between dies 33, 34, the transfer mechanism does not obstruct the ejection of the headed blank.

While that embodiment of the invention now preferred has been shown and described, it will be understood the invention is not confined to the details thereof and that numerous modifications are possible. For example, while three dies have been shown, it will be understood the middle die 33 may be divided into two blocks similar to the blocks 32 and 34, if one is prepared to incur the disadvantages of the consequently greater lateral travel of the transfer mechanism that will be necessitated. While the machine disclosed operates by the two stroke method, it will be understood the invention is applicable to a machine operating on a method involving three or more strokes or stages of production by appropriately increasing the number of dies and the number of transfer mechanisms, two such mechanisms being required to operate on three stroke method. It will be understood that in such a multiplication it is not necessary to duplicate all the parts of the transfer mechanism but that it will suffice to widen the body block and slide to accommodate two sets of fingers and jaws with their operating springs and cams.

Instead of using two or more pairs of open dies, any of the pairs may be replaced by a solid die.

While the dies and punches are preferably arranged in horizontal rows for ease of access and inspection, it will be understood they may be arranged in vertical rows and the transfer of blanks effected in a vertical direction with appropriate re-location of the various actuating mechanisms.

Having thus described our invention, what we claim is:

1. In a machine of the character described, in combination, a series of aligned co-acting open dies and co-operating punches and ejector; a stationary shearing die; means for feeding stock through the said shearing die and between two of the said open dies; mechanism for shifting the said open dies to shear stock into blank form; and further means, independent of the punches and ejector, arranged to successively withdraw blanks in their axial direction from between co-acting dies and insert same in their axial direction between associated co-acting dies.

2. In a machine of the character described, in combination, a plurality of aligned co-acting open dies and co-operating punches and ejector; a stationary shearing die; mechanism arranged to feed stock through the said stationary die and between a pair of the said open dies; mechanism for shifting the said open dies to shear stock into blank form; and further means, independent of said punches and ejector, arranged for successive operation adapted to withdraw a blank in its axial direction from between the pair of open dies associated in operative relation with the said shearing die, shift the said blank in the plane of the said open dies and insert it in its axial direction between a second pair of co-acting open dies.

3. In a machine of the character described, in combination, a plurality of aligned co-acting open dies and co-operating punches and ejector; a stationary shearing die; mechanism arranged to feed stock through the said stationary die and between two said co-acting open dies; further mechanism for shifting the said open dies to shear stock into blank form; and transfer mechanism, independent of said punches and ejector, including blank engaging and holding means arranged for successive operation to withdraw a blank in its axial direction from between the aforesaid two co-acting open dies, to shift longitudinally of said die alignment in a plane remote from said open dies, to insert the said blank between two associated co-acting open dies, and to return toward the first said two co-acting open dies in a path of travel adjacent to the plane of the said open dies.

4. In a machine of the character set forth, in combination, a plurality of open dies; reciprocatable means including punches and an ejector arranged to co-act with the said dies; and further means adapted to shift blanks with respect to the said dies for successive operation thereupon by at least one of said punches, arranged to operate in such wise that a blank is withdrawn in its axial direction from between open dies, is shifted in a lateral direction with respect to the path of travel of blank withdrawal, and is subsequently shifted toward and is inserted in its axial direction between associated co-acting dies.

5. In a machine of the class described, in combination, a plurality of dies arranged in a line, a reciprocatable means including tools adapted to co-act with the said dies to act upon blanks supported thereby, and further means including a blank holding device arranged to shift blanks with respect to the said dies for successive operation thereupon by the said tools, arranged to operate in such wise that blanks are successively engaged and shifted away from the said dies in a plane at right angles to the line thereof, then in line with the said dies and subsequently at right angles to the line of and towards the said dies to blank disengaging position.

6. In a machine of the class identified, in combination, die means arranged to simultaneously support blanks in a primary and in a secondary work station; reciprocatable means including punches and an ejector adapted to simultaneously act upon blanks supported by the said die means; and further means, including a blank holding device, arranged for successive operations in such wise that a blank is withdrawn in its axial direction from the initial work station of the said die means, is transferred to the secondary work station of the said die means, and is then engaged in its axial direction with the die means.

7. In a machine of the identified class, in combination, a plurality of dies arranged in a line; reciprocatable means including tools adapted to act upon blanks supported by the said dies; transfer mechanism embodying blank holding means arranged to shift blanks with respect to the said dies for successive operation thereupon by the said tools; and actuating means for the said transfer mechanism adapted to successively shift its blank holding means away from the initial blank engaging position and the said dies, then in line with the said dies, subsequently toward the said dies to blank discharging position, then adjacent to the said line of dies and thence back to the initial blank engaging position.

8. In a machine of the character described, in combination, a plurality of aligned co-acting open dies adapted to support blanks during upsetting and heading operations; and mechanism for successively transferring blanks with respect to the said dies from blank upsetting to blank heading stations, said mechanism embodying a pair of blank engaging fingers and means for shifting the said fingers transversely, longitudinally and vertically with respect to the line of co-relation of the said dies.

9. In a machine of the character described, in combination, a plurality of aligned co-acting open dies adapted to support blanks during upsetting and heading operations; and mechanism for successively transferring blanks with respect to the said dies from blank upsetting to blank heading stations, said mechanism embodying blanks engaging and holding fingers and means for moving the said fingers toward and away from the dies in the axial direction thereof and transversely of the machine in a plane forward of the said dies and in the opposite direction in closer relation to the said dies.

10. In a heading machine, in combination, a plurality of open dies; reciprocatable means including punches arranged to co-act with the said dies; and transfer mechanism adapted to shift blanks with respect to the said dies for successive operations thereupon; said transfer mechanism including a pair of co-acting blank engaging fingers, mechanism for shifting the said fingers in a horizontal plane in the direction of movement of the said punches, mechanism for shifting the said fingers in a horizontal plane transversely with respect to the line of travel of the said punches, and mechanism for moving the said fingers vertically.

11. In a heading machine, in combination, a plurality of open dies; reciprocatable means carrying punches arranged to co-act with the said dies; and transfer mechanism including blank gripping fingers adapted to shift blanks with respect to the said dies for successive operations, said transfer mechanism embodying means coordinated in timed relation with respect to the aforesaid reciprocatable means and punches, arranged to move said finger vertically into blank engaging position ensuing a blank upsetting operation, to withdraw the upset blank in its axial direction from its retaining dies, to shift the said upset blank to register with a second pair of said dies, to insert the said blank in its axial direction between the said pair of dies, to lower out of the path of travel of the said punches, and subsequently to return to upset blank engaging position.

12. In a heading machine, a frame structure; a plurality of aligned co-acting open dies arranged in a plane transversely of the said frame structure; and blank transfer mechanism arranged to shift blanks with respect to the said dies for successive heading operations, said transfer mechanism including a carrier bar arranged to reciprocate transversely with respect to the said frame structure, a body block supported by and reciprocatable transversely of the said carrier bar, a transfer slide mechanism supported by and reciprocatable vertically with respect to the said body block, a pair of blank engaging fingers supported by the said transfer slide mechanism, and mechanism co-ordinated in timed relation for actuating the said carrier bar, body block and transfer slide mechanism.

13. In a heading machine, blank transfer mechanism including a reciprocatable carrier bar, a body block supported by and reciprocatable transversely with respect to the said carrier bar, a transfer slide mechanism supported by and reciprocatable vertically with respect to the said body block, a pair of co-acting blank engaging fingers supported by the said transfer slide mechanism, an oscillatable shaft, a sleeve splined to and reciprocatable with respect to the said shaft, a link arranged at either side of the said body block secured at its respective ends to the said sleeve and the said carrier bar, and a crank arm secured to the said sleeve and operatively connected with the lower end of the said transfer slide mechanism.

14. In a heading machine, in combination, a body block, means to support said block for movement transversely and longitudinally of the heading machine and means to move said block as aforesaid, a transfer slide mechanism supported by and reciprocatable vertically with respect to the said body block, and a pair of blank engaging fingers supported in co-acting relation on the said transfer slide mechanism.

THOMAS P. SHELLY.
THOMAS R. SHELLY.